United States Patent
Kühl et al.

(10) Patent No.: US 10,914,443 B2
(45) Date of Patent: Feb. 9, 2021

(54) HEADLIGHT LENS FOR A MOTOR VEHICLE HEADLIGHT

(71) Applicant: DOCTER OPTICS SE, Neustadt an der Orla (DE)

(72) Inventors: Siemen Kühl, Jena (DE); Mohsen Mozaffari, Gera (DE); Daniela Hoffmann, Neustadt an der Orla (DE)

(73) Assignee: DOCTER OPTICS SE, Neustadt an der Orla (DE)

( * ) Notice: Subject to any disclaimer, the term of this patent is extended or adjusted under 35 U.S.C. 154(b) by 0 days.

(21) Appl. No.: 16/492,825

(22) PCT Filed: Mar. 15, 2018

(86) PCT No.: PCT/EP2018/056485
§ 371 (c)(1),
(2) Date: Sep. 10, 2019

(87) PCT Pub. No.: WO2018/177757
PCT Pub. Date: Oct. 4, 2018

(65) Prior Publication Data
US 2020/0149699 A1    May 14, 2020

(30) Foreign Application Priority Data

Mar. 29, 2017   (DE) .......................... 10 2017 003 015

(51) Int. Cl.
*F21S 41/255*   (2018.01)
*F21S 41/275*   (2018.01)
(Continued)

(52) U.S. Cl.
CPC ............ *F21S 41/255* (2018.01); *F21S 41/275* (2018.01); *F21S 41/40* (2018.01); *G02B 5/0215* (2013.01);
(Continued)

(58) Field of Classification Search
CPC ........ F21S 41/275; F21S 41/40; G02B 5/0215
See application file for complete search history.

(56) References Cited

U.S. PATENT DOCUMENTS 3,708,221 A    1/1973  Schaefer
2005/0200976 A1*  9/2005  Bonitz .................. F21S 41/255
                                                             359/708

(Continued)

FOREIGN PATENT DOCUMENTS

DE    19829586 A1   1/2000
DE    10033776 A1   8/2001
(Continued)

OTHER PUBLICATIONS

PCT International Search Report and Written Opinion completed by the ISA/EP dated May 29, 2018 and issued in connection with PCT/EP2018/056485.
(Continued)

*Primary Examiner* — Evan P Dzierzynski
(74) *Attorney, Agent, or Firm* — Barnes & Thornburg LLP (57) ABSTRACT

The present disclosure relates to a headlight lens for a vehicle headlight, for example a motor vehicle headlight, said headlight lens comprising a press-molded lens member and an optically effective surface, the surface having a modulation with a wave of which the amplitude runs along the surface of the headlight lens.

23 Claims, 8 Drawing Sheets

(51) Int. Cl.
*F21S 41/40* (2018.01)
*G02B 5/02* (2006.01)
*G02B 19/00* (2006.01)

(52) U.S. Cl.
CPC ........ *G02B 5/0294* (2013.01); *G02B 19/0014* (2013.01)

(56) References Cited

U.S. PATENT DOCUMENTS

| | | | |
|---|---|---|---|
| 2010/0172146 A1* | 7/2010 | Fischer | F21S 41/275 362/520 |
| 2015/0292701 A1* | 10/2015 | Wintzer | F21S 41/147 362/520 |

FOREIGN PATENT DOCUMENTS

| | | |
|---|---|---|
| DE | 10052653 A1 | 2/2002 |
| DE | 10118687 A1 | 10/2002 |
| DE | 10226471 A1 | 1/2004 |
| DE | 20320546 U1 | 4/2005 |
| DE | 202004005936 U1 | 4/2005 |
| DE | 102004048500 A1 | 4/2006 |
| DE | 102008023551 A1 | 11/2009 |
| DE | 102013002965 A1 | 8/2014 |
| DE | 102014100727 A1 | 7/2015 |
| EP | 2489925 A1 | 8/2012 |
| WO | 2002031543 A1 | 4/2002 |
| WO | 2003074251 A1 | 9/2003 |
| WO | 2009012736 A1 | 1/2009 |
| WO | 2009109209 A1 | 9/2009 |
| WO | 2012072188 A2 | 6/2012 |
| WO | 2012072189 A2 | 6/2012 |
| WO | 2012072190 A2 | 6/2012 |
| WO | 2012072191 A2 | 6/2012 |
| WO | 2012072192 A2 | 6/2012 |
| WO | 2012072193 A2 | 6/2012 |
| WO | 2012146328 A1 | 11/2012 |
| WO | 2013068053 A1 | 5/2013 |
| WO | 2013068063 A1 | 5/2013 |
| WO | 2013170923 A1 | 11/2013 |
| WO | 2013178311 A1 | 12/2013 |
| WO | 2014072003 A1 | 5/2014 |
| WO | 2014114307 A1 | 7/2014 |
| WO | 2014114308 A1 | 7/2014 |
| WO | 2014114309 A1 | 7/2014 |

OTHER PUBLICATIONS

Bosch—Automotive Handbook, 9th Edition, pp. 1040, 1044-1045 (Book reference, pages available by request).
English translation of the PCT International Preliminary Report on Patentability completed by the ISA/EP and issued in connection with PCT/EP2018/056485.

* cited by examiner

HEADLIGHT LENS FOR A MOTOR VEHICLE HEADLIGHT

CROSS-REFERENCE TO RELATED APPLICATIONS

This application is a U.S. national counterpart application of international application serial No. PCT/EP2018/056485, filed Mar. 15, 2018, which claims priority to German Patent Application No. 102017003015.4, filed Mar. 29, 2017.

FIELD OF THE INVENTION

The present disclosure relates to a headlight lens for a vehicle headlight, for example a motor vehicle headlight, and a vehicle headlight.

BACKGROUND

Headlight lenses, for example, are disclosed in U.S. Pat. No. 3,708,221, WO 02/31543 A1, WO 03/074251 A1, DE 100 52 653 A1, DE 100 33 776 A1, DE 101 18 687 A1, and DE 198 29 586 A1.

DE 203 20 546 U1 discloses a lens press-moulded on both sides and having a curved surface, with a plane surface and with a retaining border moulded to the lens edge, wherein a support border of a thickness of at least 0.2 mm projecting over the plane surface is formed at the retaining border. The support border is formed at the outer periphery of the headlight lens. Another headlight lens with a support border is disclosed, e. g., in DE 10 2004 048 500 A1.

DE 20 2004 005 936 U1 discloses a lens for illumination purposes, for example a lens for a headlight for imaging the light emitted by a light source and reflected by a reflector for creating a predetermined illumination pattern, with two opposed surfaces, wherein at at least one first surface, areas with different optical scattering effects are provided.

DE 10 2008 023 551 A1 discloses an optical lens for being employed in a projection-type headlight for motor vehicles to image light beams emitted by a light source for creating a predetermined illumination distribution, wherein on at least one surface of the lens, areas with an optical scattering effect are formed which are subdivided into a periodic pattern of individual cells which each have one structure element causing a selective scattering of the passing light. Here, the shape of the structure elements is formed from a repeated mathematical function in a first plane extending through the optical axis of the lens or in parallel thereto, wherein the shape of the structure elements in the first plane is formed such that the structure elements scatter a reduced light amount towards larger deflection angles.

In view of their optical properties or light-related standard values, headlight lenses are subject to stringent design criteria. This is for example true in view of a bright-dark boundary as it is represented, by way of example, in Bosch—Automotive Handbook, 9$^{th}$ edition, ISBN 978-1-119-03294-6, page 1040. Important light-related standard values are the gradient G of the bright-dark boundary and the glare value HV of the vehicle headlight into which the headlight lens will be installed. One example of the entirety of light-related values to be adhered to is disclosed, for example, in Bosch—Automotive Handbook, 9$^{th}$ edition, ISBN 978-1-119-03294-6, page 1040.

SUMMARY

The present disclosure concerns a headlight lens or a headlight or a motor vehicle for example for a motor vehicle headlight, having at least one light entry face and at least one light exit face, wherein on the light entry face and/or the light exit face of the headlight lens, a modulation is provided, wherein the modulation comprises a plurality of (periodic) waves extending for example in parallel with respect to each other, wherein the deflection and/or amplitude of each one of the plurality of waves extends in parallel to the (contour of) the surface on which the modulation is formed (the modulation is projected onto the lens in the normal direction or in the direction of the optical axis (z-direction)).

EMBODIMENTS OF THE PRESENT DISCLOSURE

Headlight lenses may be used in projection-type headlights, also referred to as PES headlights (cf. e. g. Bosch—Automotive Handbook, 9$^{th}$ edition, ISBN 978-1-119-03294-6, pages 1044 and 1045). However, the present disclosure may also be employed, for example, in connection with secondary lenses for matrix light or with respect to an auxiliary optical system for matrix light. For example, the disclosed modulation may be provided on the curved surface of the headlight lens of DE 10 2014 100 727 A1 designated with reference numeral 4. The disclosed modulation is for example employed in not point symmetric lenses or lenses of a not point symmetric base. One example of such a lens is the headlight lens of DE 10 2014 100 727 A1 designated with reference numeral 4. For example, the headlight lens or the modulation may be press-moulded, or the disclosure may moreover also be employed in connection with a headlight lens according to WO 2014/114309 A1, WO 2014/114308 A1, WO 2014/114307 A1, WO 2014/072003 A1, WO 2013/178311 A1, WO 2013/170923 A1, WO 2013/068063 A1, WO 2013/068053 A1, WO 2012/146328 A1, WO 2012/072188 A1, WO 2012/072189 A2, WO 2012/072190 A2, WO 2012/072191 A2, WO 2012/072192 A1, and/or WO 2012/072193 A2, wherein the modulation is provided on the light exit face.

The headlight lens consists of a transparent material or includes a transparent material. A transparent material in the sense of the disclosure is for example glass. A transparent material in the sense of the disclosure is for example inorganic glass. A transparent material in the sense of the disclosure is for example silicate glass. A transparent material in the sense of the disclosure is for example glass as it is described in PCT/EP2008/010136. Glass in the sense of the disclosure for example comprises:

0.2 to 2% by weight of $Al_2O_3$,
0.1 to 1% by weight of $Li_2O$,
0.3, for example 0.4, to 1.5% by weight of $Sb_2O_3$,
60 to 75% by weight of $SiO_2$,
3 to 12% by weight of $Na_2O$,
3 to 12% by weight of $K_2O$, and
3 to 12% by weight of CaO.

A wave in the sense of the disclosure is for example a sine or cosine function. A wave in the sense of the disclosure is for example a sine or cosine function having an amplitude $A_{xy}$ and a period length $\lambda_{xy}$. Here, the amplitude $A_{xy}$ is for example oriented in the y-direction, the x-direction or the x- and y-directions. x-direction is here a direction orthogonal to a z-direction. A y-direction is also a direction orthogonal to the z-direction, which, however, is different from the x-direction. It is for example provided that the x-direction and the y-direction are orthogonal with respect to each other. The z-direction is the direction in the optical axis of the surface with the modulation or the optical axis of the headlight lens or an orthogonal or normal or surface normal each in a point of the contour of the surface comprising the modulation. The modulation has a distinction in the z-direction which is defined by an amplitude $A_z$. In this sense, the contour or surface spanned by the x-coordinate and the y-coordinate may be a plane or a curved surface. The expansion or height of a modulation in the z-direction may be intended to be larger in the centre or in a central region of the surface than the expansion in the z-direction in an edge region of the surface on which the modulation is arranged.

In a development, the individual waves of the plurality of waves of the modulation interdigitate with each other. The waves of the modulations may be shifted with respect to each other by a phase-shift. Press-molded for example means, in the sense of the disclosure, to press an optically effective surface in such a way that a subsequent finishing of the contour of this optically effective surface may be omitted or is omitted or not intended at all. It is thus for example intended that a press-molded surface is not polished after press-molding. For press-molding, it is for example intended that initially, a blank is formed, the blank is heated or its temperature gradient reversed, and the heated or temperature-controlled blank is press-molded into the headlight lens with the desired modulation. The projection of the blank onto a plane or the largest geometric shape resulting with such a projection will be referred to as base of the blank below. In an development, the base is polygonal or has a polygonal shape, for example, however, with rounded corners, wherein it is for example provided that the bottom-side base of the blank is also polygonal, for example, however, includes rounded corners. In a further development, the base is triangular or has a triangular shape, for example, however, with rounded corners, wherein it is for example provided that the bottom-side base of the blank is also triangular or has a triangular shape, for example, however, includes rounded corners. In a development, the base is rectangular or has a rectangular shape, for example, however, with rounded corners, wherein it is for example provided that the bottom-side base of the blank is also rectangular or has a rectangular shape, for example, however, includes rounded corners. In a further development, the base is square, for example, however, with rounded corners, wherein it is for example provided that the bottom-side base of the blank is also square, for example, however, includes rounded corners. In a further development, the base is oval, wherein it is for example provided that the bottom-side base of the blank is also oval.

$A_{xy}$ is for example not less than 0.2 mm, advantageously not less than 0.3 mm. $A_{xy}$ is for example not more than 3 mm, advantageously not more than 2 mm.

$A_{xy}$ is for example not less than 0.5 mm, advantageously not less than 1 mm. $A_{xy}$ is for example not more than 3 mm, advantageously not more than 2 mm.

$A_z$ is for example not less than 0.2 µm, advantageously not less than 0.5 µm. In the centre of the headlight lens, $A_z$ is for example not less than 1 µm, advantageously not less than 2 µm. At the edge of the headlight lens, $A_z$ is for example not less than 0.2 µm, advantageously not less than 0.5 µm. $A_z$ is for example not more than 10 µm, advantageously not more than 8 µm. $A_z$ advantageously decreases towards the edge of the lens (damping), the amplitude $A_z$ decreases orthogonally towards the modulation (i. e. it extends in a band around the modulation with a width $w_s$). In the centre of the headlight lens, $A_z$ is for example not more than 10 µm, advantageously not more than 8 µm. At the edge of the headlight lens, $A_z$ is for example not more than 4 µm, advantageously not more than 2 µm.

$w_s$ is for example not less than 0.1 mm, advantageously not less than 0.2 mm, $w_s$ is for example not more than 1 mm, advantageously not more than 0.5 mm.

In a further development, the light entry face is plane and the light exit face convexly curved, wherein the modulation is provided on the light exit face, wherein the headlight lens comprises a lens edge externally at the convexly curved light exit face, wherein the light entry face projects in the direction of an optical axis of the headlight lens beyond the lens edge or a part of the lens edge in steps, wherein the headlight lens comprises, on the side of the headlight lens facing away from the step, a locating shoulder at the lens edge, and wherein it is e. g. provided that the essentially plane (optically effective) surface has a roughness of less than 0.1 µm.

An vehicle headlight lens comprises an aforementioned lens and a light source and a shield which may be imaged as a bright-dark boundary by means of the headlight lens. The vehicle headlight is embodied (at least as well) as a low beam headlight in an development. In a further development, the gradient of the bright-dark boundary is not larger than 0.5. In a further development, the glare value of the vehicle headlight is not larger than 1.5 Lux.

The aforementioned object is moreover achieved by a motor vehicle with an aforementioned vehicle headlight, wherein the bright-dark boundary may be imaged, in a development, onto a roadway on which the motor vehicle can be arranged. In a development, the waves of the modulation extend in a horizontal or vertical direction. However, they may also extend at an angle, e. g. 45°, diagonally across the headlight lens.

A motor vehicle in the sense of the disclosure is for example a land craft to be individually used in road traffic. Motor vehicles in the sense of the disclosure are for example not restricted to land crafts with an internal combustion engine.

DETAILED DESCRIPTION

Figure 1:
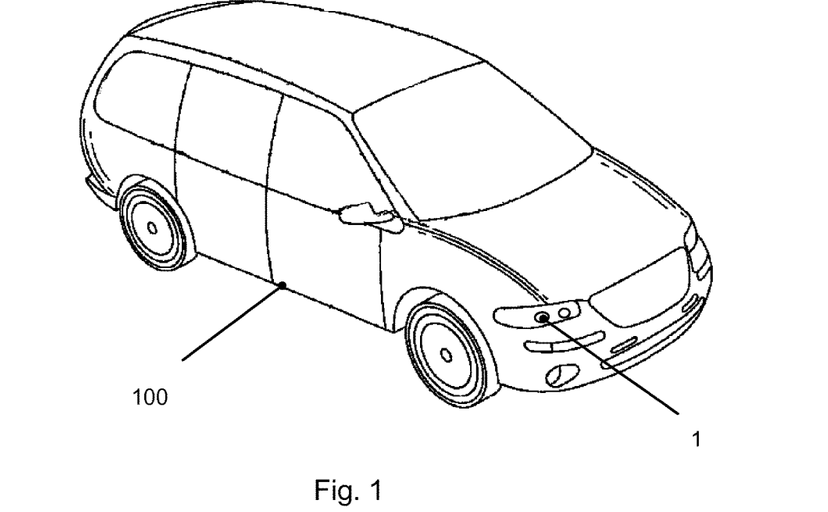
FIG. 1 shows an exemplified embodiment of a motor vehicle.
Figure 2:
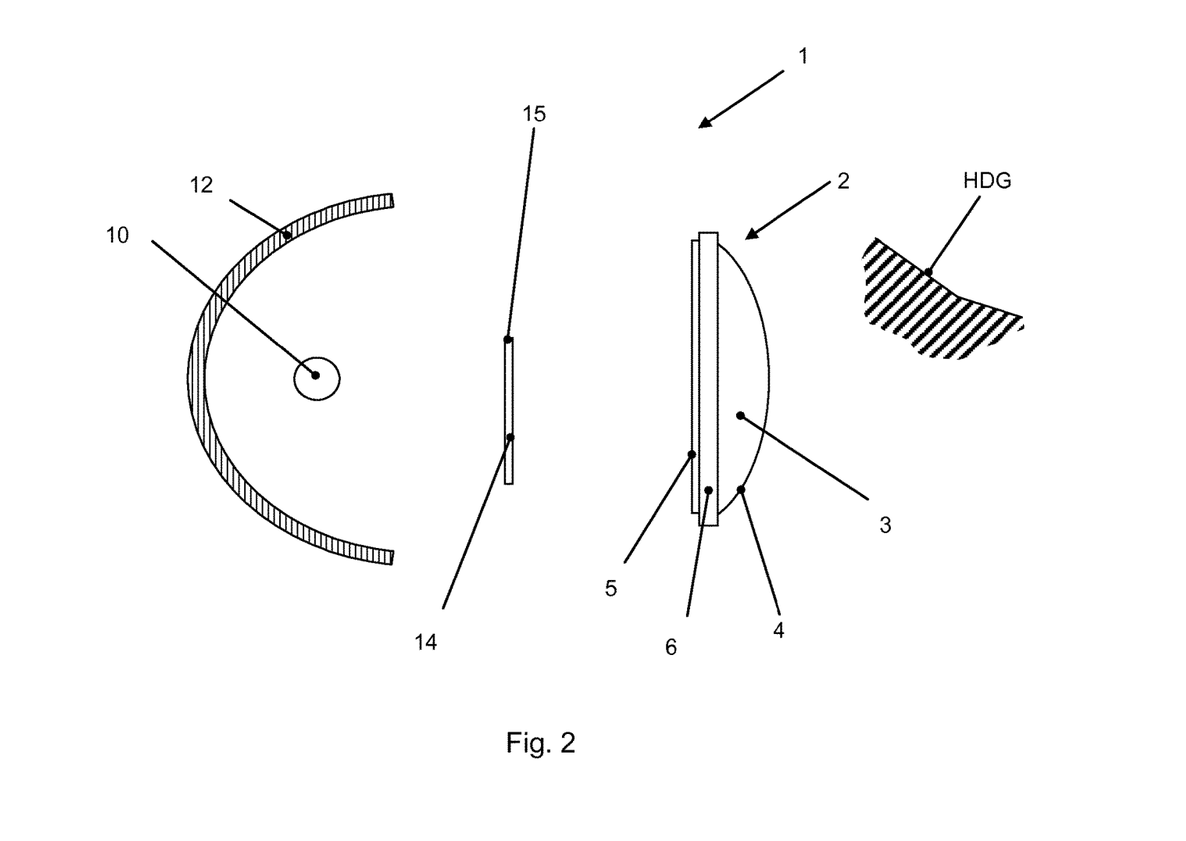
FIG. 2 shows a general representation of an exemplified embodiment of a vehicle headlight for a motor vehicle according to FIG. 1.

FIG. 1 shows a motor vehicle 100 with a vehicle headlight 1—schematically shown in FIG. 2—with a light source 10 for generating light, a reflector 12 for reflecting light that can be generated by means of the light source 10, and a shield 14. The vehicle headlight 1 moreover comprises a headlight lens 2 (for example integrally formed and press-molded on both sides) for imaging an edge of the shield 14 designated with reference numeral 15 in FIG. 2 as a bright-dark boundary HDG.

The headlight lens 2 comprises a lens body 3 of a transparent material, for example glass, that comprises an essentially plane (optically effective) surface 5 facing the light source 10 and a convexly curved, optically effective surface 4 facing away from the light source 10.

The headlight lens 2 moreover comprises a molded lens edge 6 by means of which the headlight lens 2 may be attached in the vehicle headlight 1. The elements in FIG. 2 are drawn taking into consideration simplicity and clarity, and are not necessarily drawn to scale. For example, the dimensions of some elements are represented in an exaggerated manner with respect to other elements to enhance the understanding of the exemplified embodiment of the present disclosure.

Figure 3:
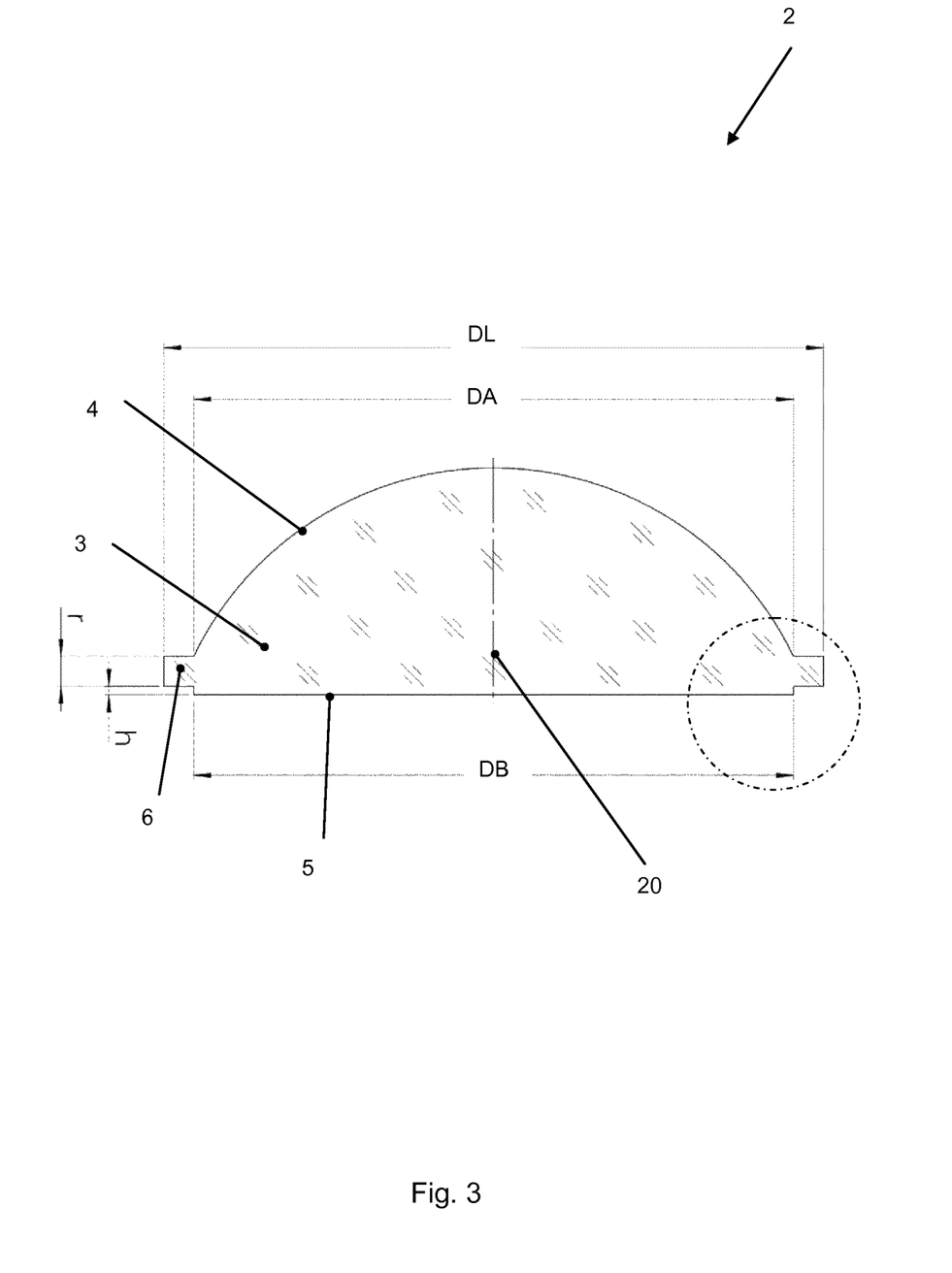
FIG. 3 shows a cross-sectional view of a headlight lens for a vehicle headlight according to FIG. 2.
Figure 4:
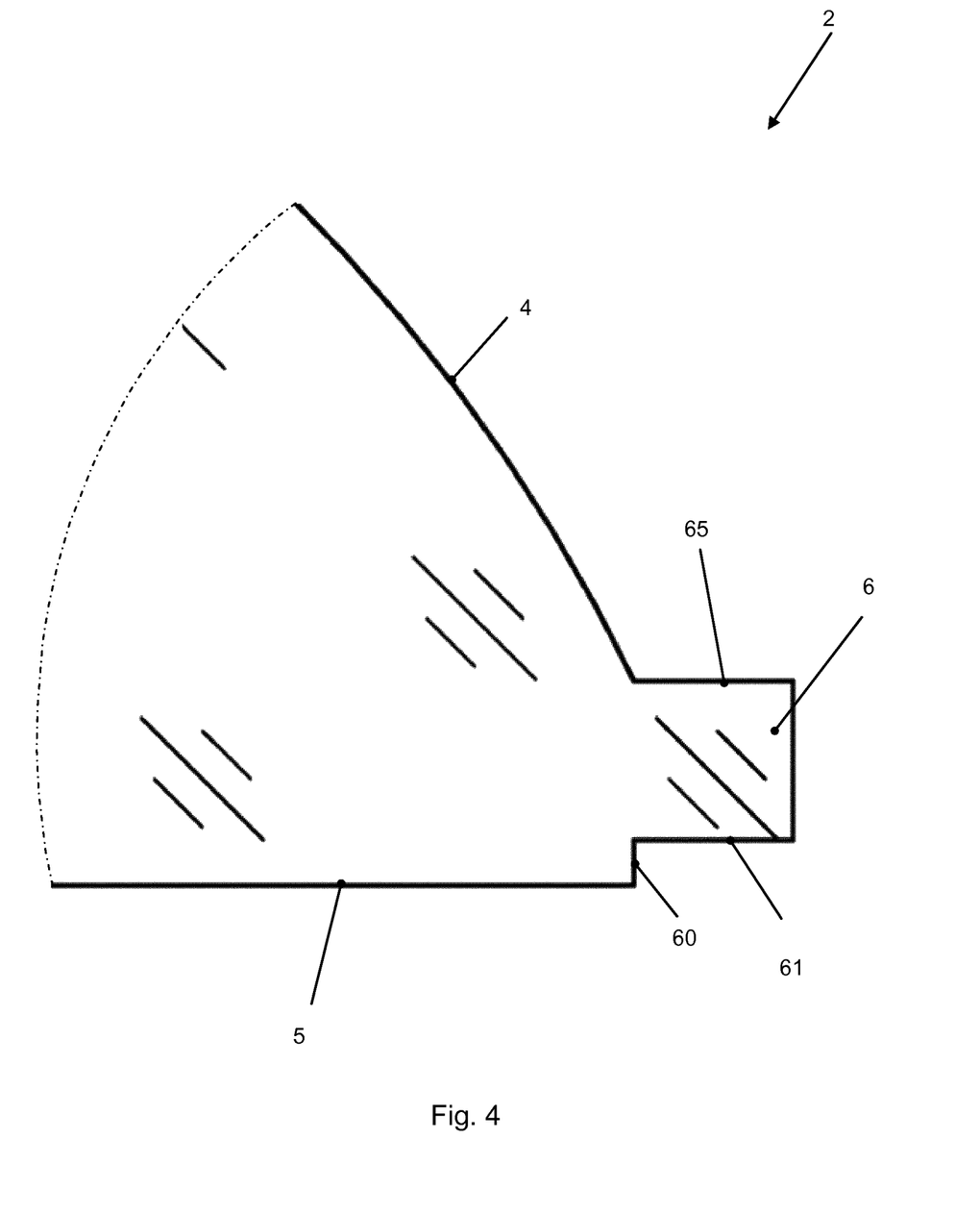
FIG. 4 shows a sectional representation according to FIG. 3.

FIG. 3 shows a cross-section through an exemplified embodiment of the headlight lens 2 for the vehicle headlight 1 according to FIG. 2. FIG. 4 shows a detail of the headlight lens 2 marked in FIG. 3 by a circle in a dot-dash line. The essentially plane, optically effective surface 5 projects beyond the lens edge 6 or the surface 61 of the lens edge 6 facing the light source 10 in the form of a step 60 towards the optical axis 20 of the headlight lens 2, wherein the height h of the step 60 is not more than 1 mm, advantageously not more than 0.5 mm. The desired value of the height h of the step 60 is advantageously 0.2 mm. The headlight lens 2 moreover has a locating shoulder 65 at the lens edge 6 on the side of the headlight lens 2 facing away from the step 60.

The thickness r of the lens edge 6 is advantageously at least 2 mm, however, advantageously not more than 5 mm. The diameter DL of the headlight lens 2 is at least 40 mm, however not more than 100 mm. The diameter DB of the essentially plane, optically effective surface 5 is e. g. equal to the diameter DA of the convexly curved optically effective surface 4. In an embodiment, the diameter DB of the essentially plane, optically effective surface 5 is not more than 110% of the diameter DA of the convexly curved optically effective surface 4. Moreover, the diameter DB of the essentially plane, optically effective surface 5 amounts to advantageously at least 90% of the diameter DA of the convexly curved optically effective surface 4. The diameter DL of the headlight lens 2 is advantageously approximately larger by 5 mm than the diameter DB of the essentially plane, optically effective surface 5 or the diameter DA of the convexly curved optically effective surface 4.

Figure 5:
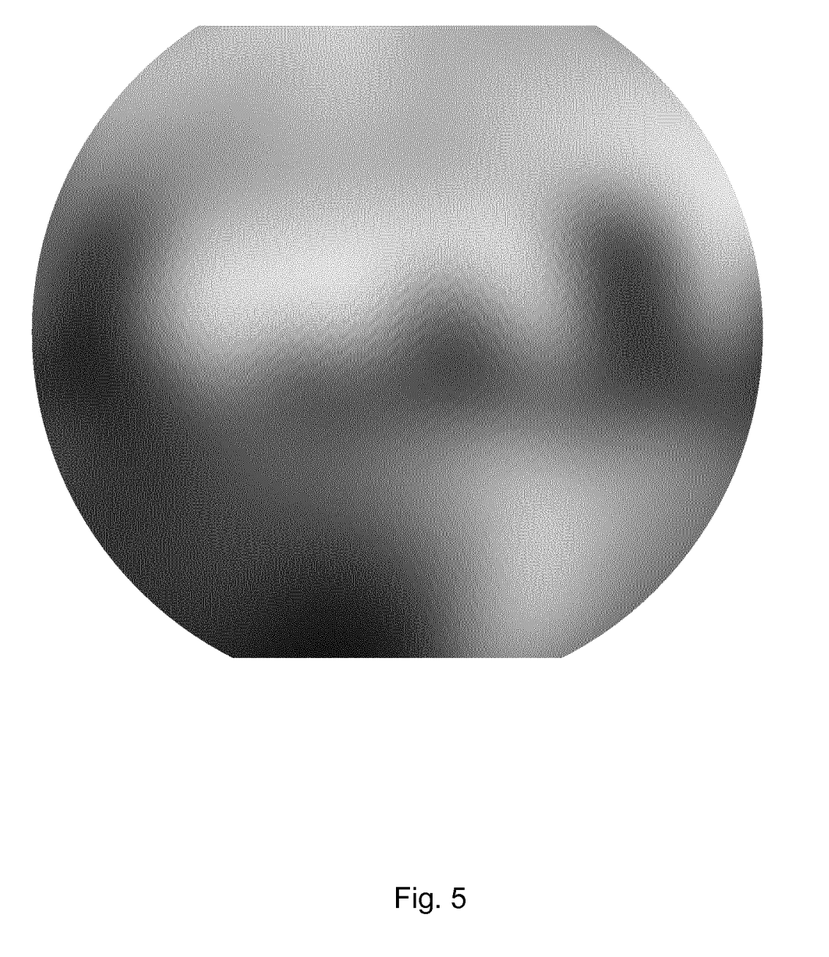
FIG. 5 shows a photographic representation of a headlight lens with an exemplified embodiment of a claimed modulation in a plan view.
Figure 6:
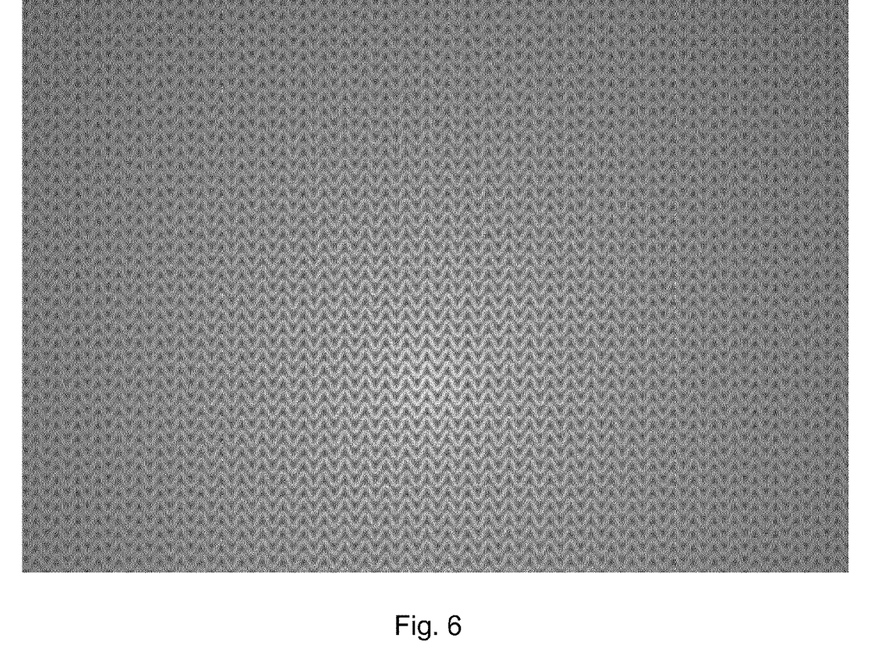
FIG. 6 shows an enlarged sectional representation of the modulation according to FIG. 5.

The optically effective surface 4 has a modulation as it is shown, for example, in FIG. 5 as a photographic image of another headlight lens. FIG. 6 shows an enlarged representation of a detail of FIG. 5. The modulation comprises interdigitating waves whose wave amplitude extends in parallel to the (contour of the) surface. The height of the modulation may decay in the direction orthogonal to the (contour of the) surface as can be seen by the shade in FIG. 6. Here, high values of the extension of the modulation in the direction orthogonal to the surface 4 (z-direction) are shown to be brighter, and small values are shown to be darker.

Figure 7:
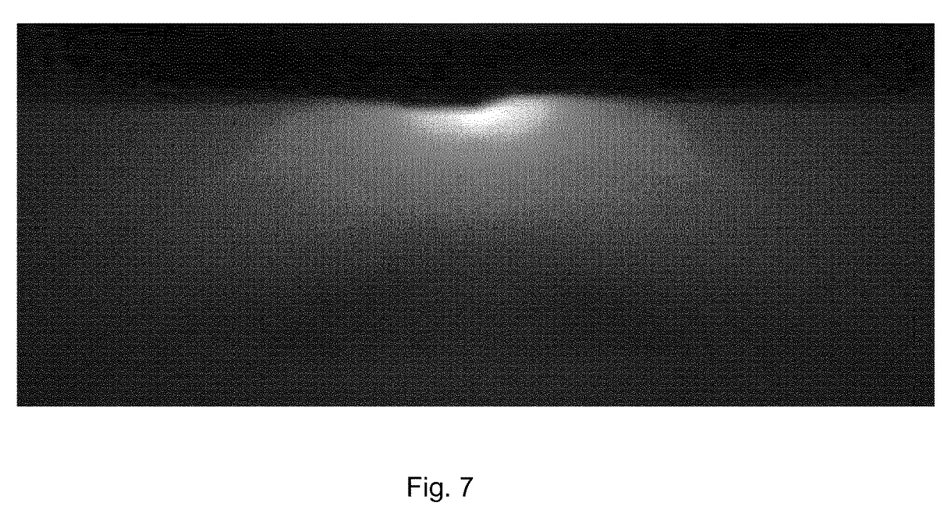
FIG. 7 shows a bright-dark boundary created by means of the headlight lenses according to FIG. 3 in a photographic representation.

By means of the modulation according to the present disclosure, suited light values are created, as is shown, for example, with reference to a photo of a bright-dark boundary in FIG. 7. The light distribution is here fringe-free.

Figure 8:
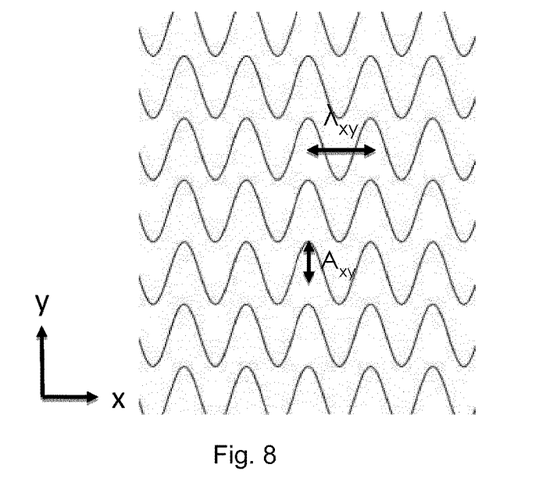
FIG. 8 shows a general representation of the modulation according to FIG. 7.
Figure 9:
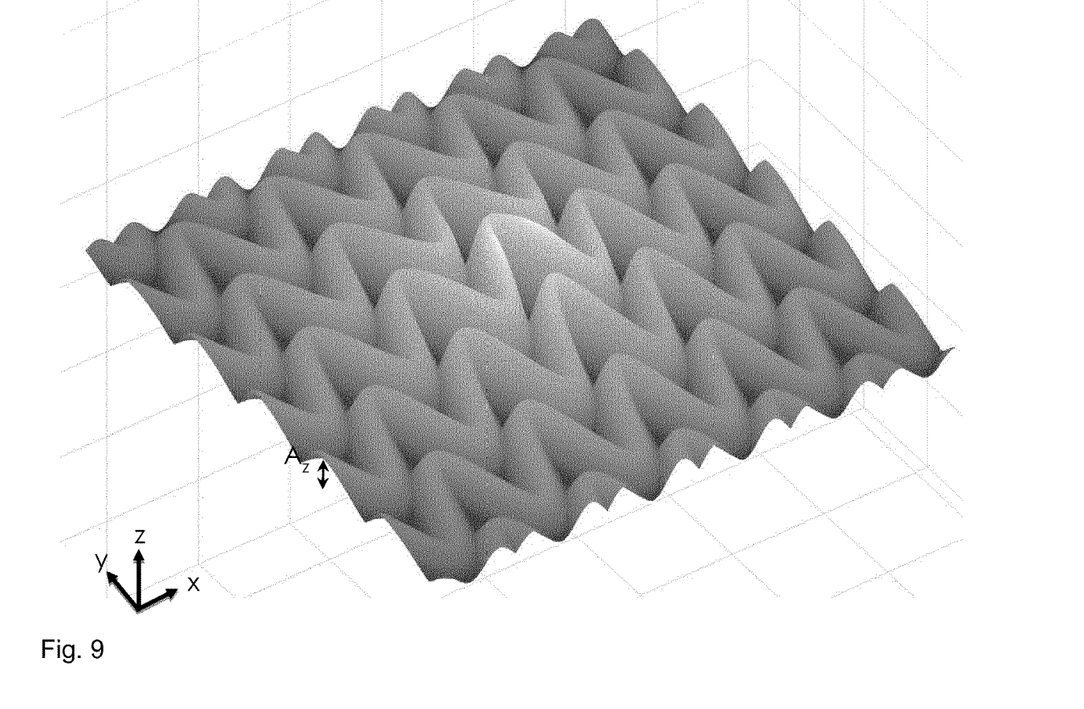
FIG. 9 shows a sectional representation of the modulation according to FIG. 7 in a perspective plan view.
Figure 10:
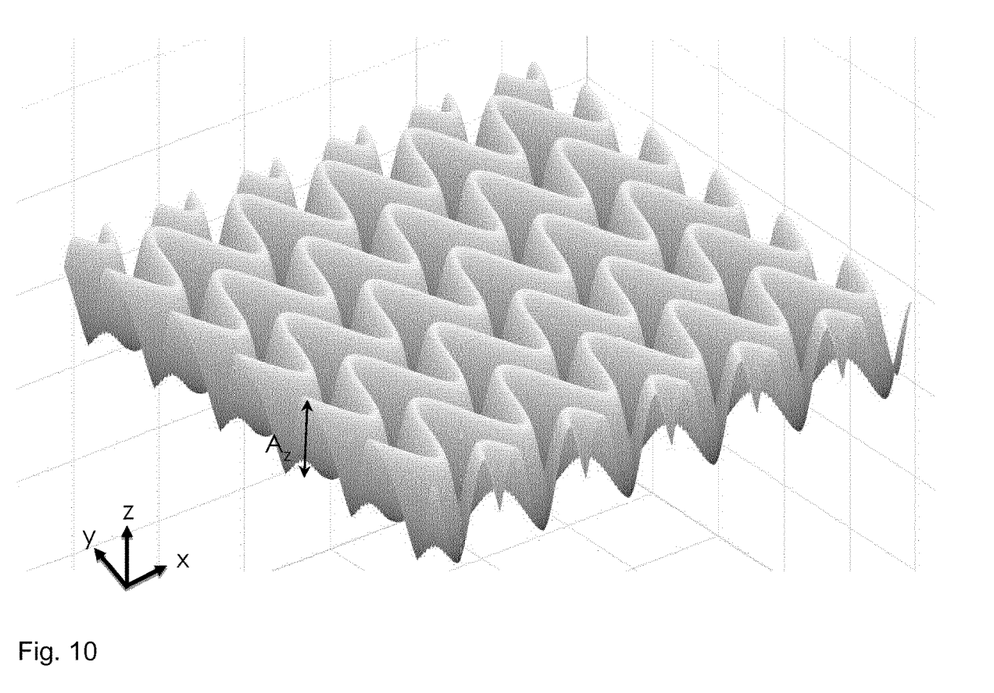
FIG. 10 shows a sectional representation of a further exemplified embodiment of a modulation in a perspective plan view.
Figure 11:
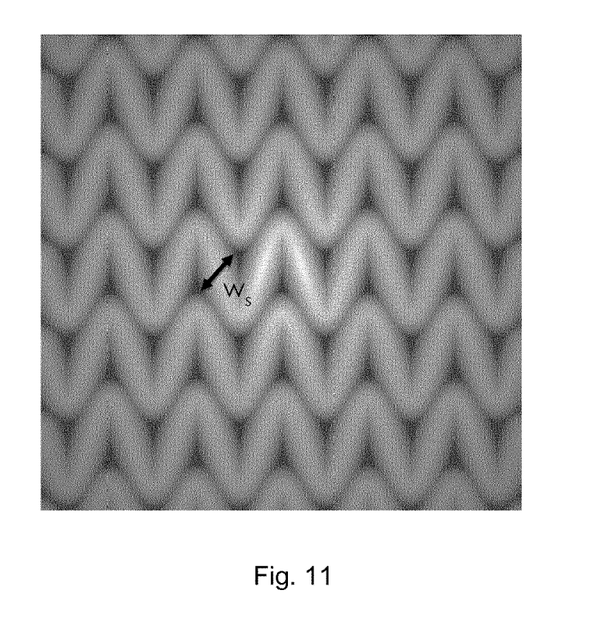
FIG. 11 shows the detail of the modulation according to FIG. 9 in a plan view.
Figure 12:
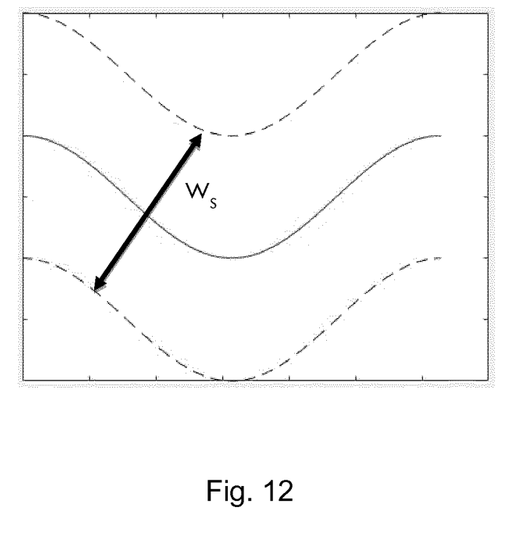
FIG. 12 shows an illustrative representation of the definition of the wave width $w_s$.

FIG. 8 shows a schematic diagram of the modulation of the headlight lens according to FIG. 5 as a modulation disposed on the surface 4. Here, the coordinates x and y designate coordinates along the surface 4 or the coordinates of a plane orthogonal to the optical axis of the surface 4. $A_{xy}$ designates the amplitude of the wave in the direction of the surface 4 or the coordinates x and y (cf. FIG. 13 and FIG. 14). $\lambda_{xy}$ designates the periods or period lengths of the waves of the modulation. The z-coordinate in FIG. 9 and FIG. 10 designates the orthogonal of the normal to the surface 4 (cf. FIG. 14) or its optical axis (cf. FIG. 13). The height of the modulation or wave in the z-direction or in the direction of the z-coordinate is designated with $A_z$. In FIG. 9, the wave of the modulation is shown with a decaying value for $A_z$ and in FIG. 10 with a constant value for $A_z$. With a decaying value $A_z$, it is for example intended that the highest values for $A_z$ are provided in the centre of the surface 4, and the value $A_z$ decays or is decreased in the direction of the edge of the lens 2. The value $W_S$ shown in FIG. 11 designates the width of a wave of the modulation. FIG. 12 shows a detail in a schematic diagram of FIG. 11. As is represented in FIG. 9, FIG. 10 and FIG. 11, the individual waves of the modulation preferably interdigitate with each other.

The modulation or the wave has been described above with reference to an embodiment. However, it may also be used for lenses with a protruding edge (see DE 203 20 546 U1) or for lenses with a ground surface, wherein the edge and the surface for example flush in a plane manner. Moreover, the described modulation can be used, as mentioned in the beginning, in connection with matrix light or headlight lenses as they are described in WO 2014/114309 A1, WO 2014/114308 A1, WO 2014/114307 A1, WO 2014/072003 A1, WO 2013/178311 A1, WO 2013/170923 A1, WO 2013/068063 A1, WO 2013/068053 A1, WO 2012/146328 A1, WO 2012/072188 A1, WO 2012/072189 A2, WO 2012/072190 A2, WO 2012/072191 A2, WO 2012/072192 A1, and/or WO 2012/072193 A2.

Figure 13:
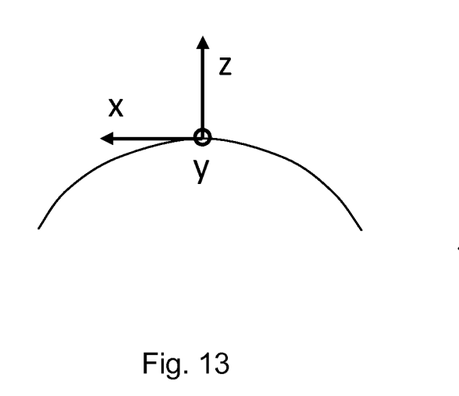
FIG. 13 shows an exemplified embodiment for a determination of the x-direction, the y-direction and the z-direction.
Figure 14:
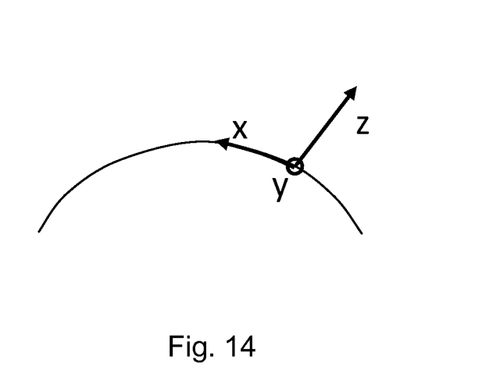
FIG. 14 shows a possible definition of the x-direction, the y-direction and the z-direction different from the determination according to FIG. 13.

FIGS. 13 and 14 show a possible definition of the coordinates x, y and z. Here, in FIG. 14, the z-direction is the respective normal or orthogonal to the contour of the surface on which the modulation is arranged. The x-coordinate and the y-coordinate are orthogonal to the z-coordinate. Preferably, the x-coordinate is moreover orthogonal to the y-coordinate. In the exemplified embodiment according to FIG. 13, the z-direction is independent of the course of the surface on which the modulation is arranged. The x-coordinate and the y-coordinate are orthogonal to the z-coordinate.

The present disclosure allows to manufacture, in an inexpensive manner, headlight lenses for vehicle headlights, for example for motor vehicle headlights, without exceeding light-related standard values.

The invention claimed is:

1. Headlight lens for a vehicle headlight, the headlight lens comprising:
at least one light entry face,
at least one light exit face, and a plurality of waves provided on the light exit face of the headlight lens,
wherein an oscillation of each one of the plurality of waves extends orthogonally to an optical axis of the light exit face, wherein the individual waves of the plurality interdigitate with each other.

2. Headlight lens according to claim 1, wherein the height of a wave in the direction of the optical axis of the light exit face is—with respect to the waves being arranged in the centre of the light exit face—larger than the height in the direction the optical axis of the light exit face in an edge region of the light exit face.

3. Headlight lens according to claim 1, wherein the height of a wave in the direction of the optical axis of the light exit face is—with respect to the waves being arranged in a central region of the light exit face—larger than the height in the direction the optical axis of the light exit face in an edge region of the light exit face.

4. Headlight lens according to claim 1, wherein the height of a wave in the direction of the optical axis of the light exit face is no more than 8 µm.

5. Headlight lens according to claim 4, wherein the width of the waves is no more than 1 mm.

6. Headlight lens according to claim 1, wherein the width of the waves is no more than 1 mm and no less than 200 µm.

7. Headlight lens according to claim 1, the headlight lens further comprising
a light passage section comprising the light exit face, and
a light tunnel which comprises the light entry face, wherein the light tunnel passes over via a bend into the light passage section such that the bend can be imaged by means of the light passage section as a bright-dark boundary by means of light entering the light entry face.

8. Headlight lens for a vehicle headlight, the headlight lens comprising:
at least one light entry face,
at least one light exit face, and
a modulation comprising a plurality of waves provided on the light exit face of the headlight lens, each wave of the plurality of waves being a sine function having an amplitude $A_{xy}$, the amplitude $A_{xy}$ being oriented in an x-direction, the x-direction being a direction orthogonal to a z-direction and orthogonal to a y-direction, the y-direction being a direction orthogonal to the z-direction, the z-direction being normal to each point of the contour of the surface comprising the modulation.

9. Headlight lens according to claim 8, wherein the individual waves of the plurality interdigitate with each other.

10. Headlight lens according to claim 9, wherein the height of a wave in the direction of the optical axis of the light exit face is—with respect to the waves being arranged in the centre of the light exit face—larger than the height in the direction the optical axis of the light exit face in an edge region of the light exit face.

11. Headlight lens according to claim 8, wherein the height of a wave in the direction of the optical axis of the light exit face is—with respect to the waves being arranged in the centre of the light exit face—larger than the height in the direction the optical axis of the light exit face in an edge region of the light exit face.

12. Headlight lens according to claim 8, wherein the height of a wave in the direction of the optical axis of the light exit face is—with respect to the waves being arranged in a central region of the light exit face—larger than the height in the direction the optical axis of the light exit face in an edge region of the light exit face.

13. Headlight lens according to claim 8, wherein the height of a wave in the direction of the optical axis of the light exit face is no more than 8 µm.

14. Headlight lens according to claim 13, wherein the width of the waves is no more than 1 mm.

15. Headlight lens according to claim 8, wherein the width of the waves is no more than 1 mm and no less than 200 µm.

16. Headlight lens according to claim 8, the headlight lens further comprising
a light passage section comprising the light exit face, and
a light tunnel which comprises the light entry face, wherein the light tunnel passes over via a bend into the light passage section such that the bend can be imaged by means of the light passage section as a bright-dark boundary by means of light entering the light entry face.

17. Vehicle headlight, the vehicle headlight comprising,
a light source,
a shield, and
a headlight lens configured for imaging an edge of the shield as a bright-dark boundary, the headlight lens comprising:
at least one light entry face,
at least one light exit face, and at least one of the group comprising:
a plurality of waves provided on the light entry face of the headlight lens, wherein the oscillation of each one of the plurality of waves extends in parallel to the contour of the light entry face,
a plurality of waves provided on the light exit face of the headlight lens, wherein the oscillation of each one of the plurality of waves extends in parallel to the contour of the light exit face,
a plurality of waves provided on the light entry face of the headlight lens, wherein the oscillation of each one of the plurality of waves extends orthogonally to the optical axis of the light entry face,
a plurality of waves provided on the light exit face of the headlight lens, wherein the oscillation of each one of the plurality of waves extends orthogonally to the optical axis of the light exit face,
a plurality of waves provided on the light entry face of the headlight lens, wherein the amplitude of each one of the plurality of waves extends in parallel to the contour of the light entry face,
a plurality of waves provided on the light exit face of the headlight lens, wherein the amplitude of each one of the plurality of waves extends in parallel to the contour of the light exit face,
a plurality of waves provided on the light entry face of the headlight lens, wherein the amplitude of each one of the plurality of waves extends orthogonally to the optical axis of the light entry face,
a plurality of waves provided on the light exit face of the headlight lens, wherein the amplitude of each one of the plurality of waves extends orthogonally to the optical axis of the light exit face.

18. Headlight according to claim 17, wherein the individual waves of the plurality interdigitate with each other.

19. Headlight according to claim 18, wherein the height of a wave is no more than 8 µm.

20. Headlight according to claim 19, wherein the width of the waves is no more than 1 mm.

21. Headlight according to claim 18, wherein the width of the waves is no more than 1 mm and no less than 100 μm.

22. Headlight according to claim 17, wherein the height of a wave is no more than 8 μm.

23. Headlight according to claim 22, wherein the width of the waves is no more than 1 mm.

* * * * *